(12) United States Patent
Masuyama et al.

(10) Patent No.: US 7,825,976 B2
(45) Date of Patent: *Nov. 2, 2010

(54) SOLID-STATE IMAGE SENSING APPARATUS AND DRIVING METHOD THEREOF

(75) Inventors: Masayuki Masuyama, Nagaokakyo (JP); Masashi Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 206 days.

This patent is subject to a terminal disclaimer.

(21) Appl. No.: 12/073,972

(22) Filed: Mar. 12, 2008

(65) Prior Publication Data

US 2008/0211949 A1 Sep. 4, 2008

Related U.S. Application Data

(62) Division of application No. 10/802,940, filed on Mar. 18, 2004, now Pat. No. 7,379,109.

(30) Foreign Application Priority Data

Mar. 20, 2003 (JP) ............... 2003-078890
Feb. 18, 2004 (JP) ............... 2004-041266

(51) Int. Cl.
   *H04N 5/335* (2006.01)
(52) U.S. Cl. .................................. 348/308
(58) Field of Classification Search ........... 348/308
   See application file for complete search history.

(56) References Cited

U.S. PATENT DOCUMENTS 5,973,311 A 10/1999 Sauer et al.
6,529,237 B1 3/2003 Tsay et al.
6,606,122 B1 8/2003 Shaw et al.
7,379,109 B2 * 5/2008 Masuyama et al. .......... 348/308
2003/0137594 A1 7/2003 Koizumi et al.
2005/0151868 A1 7/2005 Fraenkel et al.
2007/0115379 A1 5/2007 Endo et al.

FOREIGN PATENT DOCUMENTS

JP 5-145859 6/1993
JP 8-182005 7/1996
JP 2000-106653 4/2000

* cited by examiner

*Primary Examiner*—James M Hannett
(74) *Attorney, Agent, or Firm*—Wenderoth, Lind & Ponack, L.L.P.

(57) ABSTRACT

A solid-state image sensing apparatus which can improve the S/N ratio without enlarging the chip area in both of the mode in which pixel signals are summed and the mode in which pixel signals are not summed is provided. The solid-state image sensing apparatus includes an image sensing region 510 in which a plurality of unit cells 500 is laid out two-dimensionally, the first vertical signal line 520, a row selection circuit 530, a column selection circuit 560, a horizontal signal line 570 and a signal processing unit 100, having a sampling capacitors which accumulate signals corresponding to amplified signals of the unit cells, which selects the case of summing the signals or the case of not summing the signals, wherein the capacitance of the sampling capacitor which accumulates a signal corresponding to an amplified signal of a unit cell for each row when the sum is performed is smaller than the capacitance required for reading out the signal from said capacitor.

2 Claims, 7 Drawing Sheets

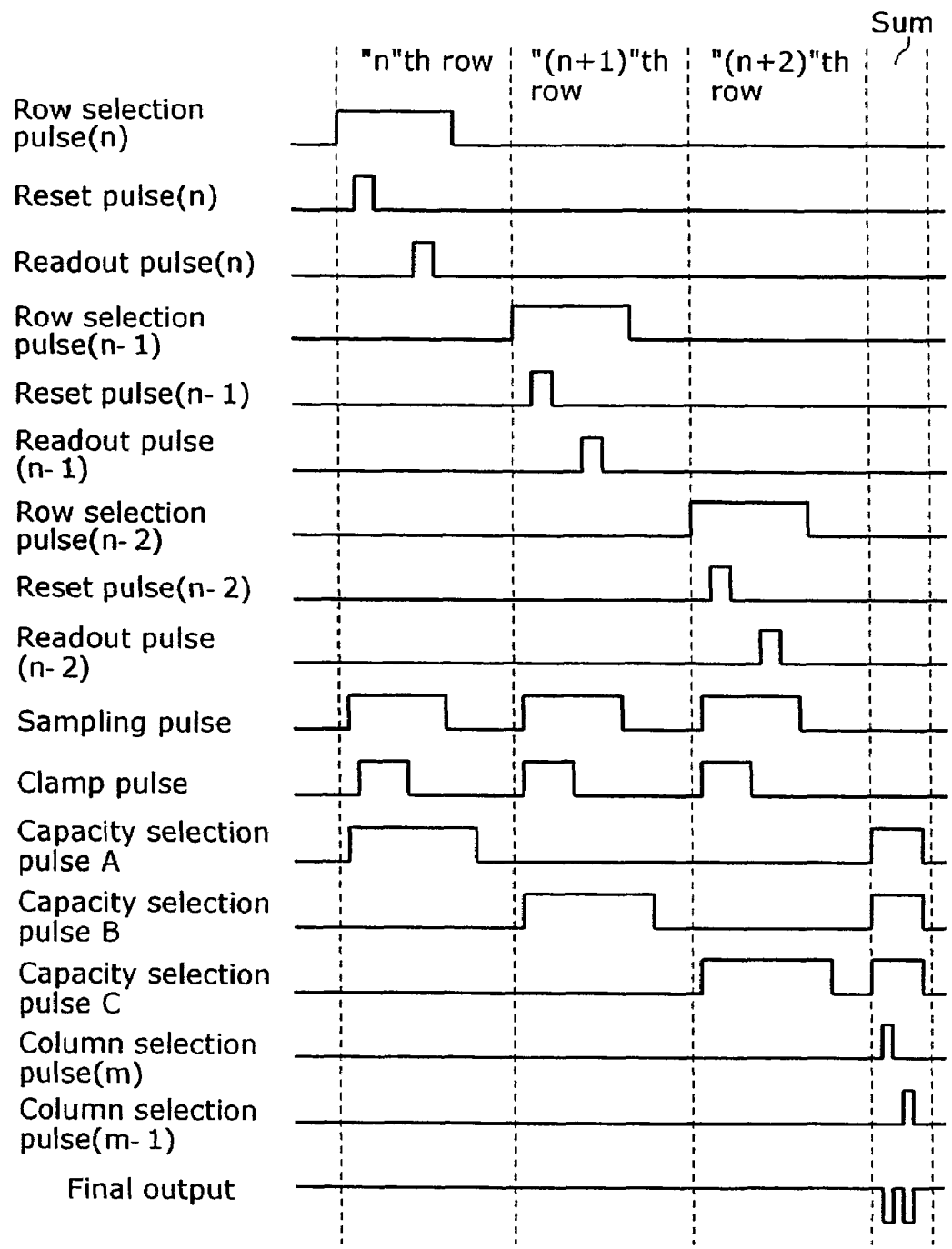

SOLID-STATE IMAGE SENSING APPARATUS AND DRIVING METHOD THEREOF

This is a 53(b) Divisional of application Ser. No. 10/802,940, filed Mar. 18, 2004 now U.S. Pat. No. 7,379,109.

BACKGROUND OF THE INVENTION (1) Field of the Invention

This invention relates to a solid-state image sensing apparatus and particularly to a solid-state image sensing apparatus which can sum pixel signals.

(2) Description of the Related Art

In recent years, in a field of a mobile terminal such as a cellular phone, one with a function to photograph has been widespread. As for the function to photograph which a mobile terminal has, high pixel density (mega pixels) for higher picture quality of a still picture is required and a mobile terminal with the function to photograph is expected to replace a low-cost Digital Still Camera (DSC). On the other hand, the function to photograph which a mobile terminal has is required to be compliant with a picture less than QVGA (about 80,000 pixels), considering animations and communication.

To meet these requirements, in a CCD solid-state image sensing apparatus with high pixel density, so-called mega pixels, for example, removal of pixels by partial sampling of pictures called cull is executed. Additionally, a sum of pixel signals in a vertical direction is performed in an amplifying-type solid-state image sensing apparatus.

FIG. 1 is a diagram showing a circuit structure of "Solid-state image sensing apparatus" (refer to Japanese Laid-Open Patent application No. 2000-106653) and an example of a solid-state image sensing apparatus in which a sum of pixel signals in a vertical direction is performed.

A conventional solid-state image sensing apparatus includes: a unit cell 500 which is composed of a photodiode 501 which converts light to charge, a readout transistor 502 which reads out the signal of the photodiode 501, an amplifier transistor 503 which amplifies the signal voltage of the photodiode 501, a reset transistor 504 which resets the signal voltage of the photodiode 501, a vertical selection transistor 505 which selects the row from which the amplified signal voltage is read out, a Floating Diffusion (FD) unit 506 which detects the signal voltage of the photodiode 501; an image area 510 where n×m pieces of the unit cells 500 are laid out two-dimensionally; the first vertical signal line 520 which transmits the signal voltage of the unit cell 500 to a signal process unit 550 column-by-column; a row selection circuit 530 which selects the unit cell 500 row-by-row; a group of load transistors 540; the signal process unit 550 which retains the signal voltage transmitted through the vertical signal line 520 and cuts noise; a column selection circuit 560 which selects the unit cell 500 column-by-column; a horizontal signal line 570 which transmits the signal voltage outputted from the signal process unit 550 to an output amplifier 580; and the output amplifier 580. In FIG. 5, to simplify an explanation, the unit cell 500 in the "n"th row and the "m"th column is shown.

FIG. 2 is a diagram showing a circuit structure of the signal process unit 550.

The signal process unit 550 includes: a sample hold transistor 600 connected to the first vertical signal line 520; a clamp capacitor 610 connected to the first vertical signal line 520 through the sample hold transistor 600; the second vertical signal line 620 connected to the first signal vertical line 610 through the clamp capacitor 610; sampling transistors 630a, 630b and 630c connected to the second vertical signal line 620; a clamp transistor 640; a column selection transistor 650 connected to the second vertical signal line 620; sampling capacitor 660a connected to the second vertical signal line 620 through the sampling transistor 630a; sampling capacitor 660b connected to the second vertical signal line 620 through the sampling transistor 630b; and sampling capacitor 660c connected to the second vertical signal line 620 through the sampling transistor 630c.

Corresponding to an application of a sampling pulse which makes an SP line high level, the sample holding transistor 600 becomes ON state and transmits the signal voltage transmitted from the first vertical signal line 520 to the clamp capacitor 610.

Additionally, corresponding to an application of a clamp pulse which makes a CP line high level, the clamp transistor 640 becomes ON state, CPDC voltage is provided to a terminal B of the clamp capacitor 610. By maintaining the voltage between the terminals A and B at the time of a reset, the clamp capacitor 610 removes fixed pattern noises different for each unit cell 500. Here, capacitance of the clamp capacitor is Ccp.

The second vertical signal line 620 transmits the signal voltage transmitted from the first vertical signal line 520 through the clamp capacitor 610.

Corresponding to an application of a capacitor selection pulse A which makes an SWA line high level, the sample holding transistor 630a becomes ON state and transfers the signal voltage transmitted through the second vertical signal line 620 to the sampling capacitor 660a. Additionally, corresponding to an application of a capacitor selection pulse B which makes an SWB line high level, the sample holding transistor 630b becomes ON state and transfers the signal voltage transmitted through the second vertical signal line 620 to the sampling capacitor 660b. Then, corresponding to an application of a capacitor selection pulse C which makes an SWC line high level, the sample holding transistor 630c becomes ON state and transfers the signal voltage transmitted through the second vertical signal line 620 to the sampling capacitor 660c.

Corresponding to an application of the clamp pulse which makes the CP line high level, the clamp transistor 640 becomes ON state and resets, to the electric potential of the CPDC line, the second vertical signal line 620, the clamp capacitor 610, the sampling capacitors, 660a, 660b and 660c.

Corresponding to an application of a column selection pulse which makes a CSEL line high level, the column selection transistor 650 becomes ON state and transfers charges accumulated in sampling capacitors 660a, 660b and 660c to the horizontal signal line 570.

Each of the sampling capacitors 660a, 660b and 660c accumulates signal voltage readout for each row. For example, the sampling capacitor 600a accumulates the signal voltage read out from the unit cell 500 in the "n"th row; the sampling capacitor 600b accumulates the signal voltage read out from the unit cell 500 in the "(n−1)"th row; and the sampling capacitor 600c accumulates the signal voltage read out from the unit cell 500 in the "(n−2)"th row. Here, the capacitance of the capacitor 660a is Csp; the capacitance of the capacitor 660b is Csp; and the capacitance of the capacitor 660c is Csp.

Operations of the conventional solid-state image sensing apparatus described above are explained based on a drive timing chart shown in FIG. 3.

When the unit cell 500 in the "n"th row is selected, a row selection pulse (n) which makes a LSET (n) line high level is applied to a vertical selection transistor 505 of the unit cell 500 in the "n"th row. As a result, the vertical selection transistor 505 becomes ON state; the amplifier transistor 503 and the group of load transistors 540 form a source follower circuit; and voltage which follows power supply voltage of the unit cell 500 is outputted from the source follower circuit to the first vertical signal line 520.

Next, the sampling pulse which makes the SP line high level is applied to the sample hold transistor 600. As a result, the sample hold transistor 600 becomes ON state and holds the voltage outputted from the source follower circuit to the first vertical signal line 520 in the clamp capacitor 610. At this time, the clamp pulse which makes the CP line high level is applied to the clamp transistor 640. As a result, the clamp transistor becomes ON state; the clamp capacitor 610 at the side connected to the second vertical signal line 620 is reset to electric potential of the CPDC line. Additionally, since a capacitor selection pulse A which makes the SWA line high level is applied at the same time, the sampling transistor 630a becomes ON state and the sampling capacitor 660a is reset to electric potential of the CPDC line.

Next, a reset pulse (n) which makes a RESET (n) line high level is applied to the reset transistor 504. As a result, the reset transistor 504 becomes ON state and electric potential of the FD unit 506 is reset. The gate voltage of the amplifier transistor 503 connected to the FD unit 506 becomes the electric potential of the FD unit 506 and the voltage corresponding to this voltage, concretely the voltage given by (the electric potential of the FD unit−Vt)×a is outputted to the first vertical signal line 520. Here, Vt is threshold voltage of the amplifier transistor 503; a is a voltage amplification factor.

Next, the clamp pulse which makes the CP line low level is applied to the clamp transistor 640. As a result, the clamp transistor 640 becomes OFF state and the second vertical signal line 620 becomes floating state.

Next, a readout pulse (n) which makes a READ (n) line high level is applied to the readout transistor 502. As a result, the readout transistor 502 becomes ON state and signal charge accumulated in the photodiode 501 is transferred to the FD unit 506. The gate voltage of the amplifier transistor 503 connected to the FD unit 506 becomes the electric potential of the FD unit 506 and the voltage corresponding to this voltage, concretely the voltage given by (the electric potential of the FD unit−Vt)×a is outputted to the first vertical signal line 520. At this time, since the clamp pulse which makes the CP line low level is applied to the clamp transistor 640, the clamp transistor becomes OFF state, and in the sampling capacitor 660a is accumulated, as the signal voltage of the unit cell 500 in the "n"th row, voltage change corresponding to the difference between the voltage outputted to the first vertical signal line 520 when the electric potential of the FD unit 506 is reset and the voltage outputted to the first vertical signal line 520 when the signal charge accumulated in the photodiode 501 is transferred to the FD unit 506. Then, the capacitor selection pulse A which makes the SWA line low level is applied and the sampling transistor 630 becomes OFF state.

Next, the unit cell 500 in the "(n−1)"th row is selected; the capacitor selection pulse B which makes the SWB line high level is applied; similar operations are repeated; and in the sampling capacitor 660b is accumulated the signal voltage of the unit cell 500 in the "(n−1)"th row. Then, the capacitor selection pulse B which makes the SWB line low level is applied and the sampling transistor 630b becomes OFF state.

Next, the unit cell 500 in the "(n−2)"th row is selected; the capacitor selection pulse C which makes the SWC line high level is applied; similar operations are repeated; and in the sampling capacitor 660c is accumulated the signal voltage of the unit cell 500 in the "(n−2)" row. Then, the capacitor selection pulse C which makes the SWC line low level is applied and the sampling transistor 630c becomes OFF state.

Next, the capacitor selection pulse A, the capacitor selection pulse B and the capacitor selection pulse C are applied at the same time to make the SWA line, and the SWB line and SWC line high level, respectively. As a result, sampling transistors 630a, 630b and 630c become ON state.

Next, the column selection pulse (m) which makes the CSEL (m) line high level, the column selection pulse (m−1) which makes the CSEL (m−1) line high level and so on are applied to the column selection transistor 650 in sequence. As a result, each column selection transistor 650 becomes ON state in sequence, signal voltage accumulated in the sampling capacitor 660a, the sampling capacitor 660b and the sampling capacitor 660c are summed and outputted to the horizontal signal line 570 in sequence.

In the operations described above, in order to accumulate the signal voltage of the unit cell 500 in the "n"th row in the sampling capacitor 660a, the clamp transistor 640 and the column selection transistor 650 become OFF state and the sampling transistor 630a becomes ON state. As a result, the gain of a circuit formed by the clamp capacitor 610 and the sampling capacitor 660a is calculated and expressed by the equation (1).

$$G=Ccp/(Ccp+Csp) \quad (1)$$

Here, in order to accumulate the signal voltage of the unit cells 500 in the "(n−1)" th row and the "(n−2)" th row in the sampling capacitors 660b and 660c, the gain of a circuit formed by the clamp capacitor 610 and the sampling capacitor 660b and the gain of a circuit formed by the clamp capacitor 610 and the sampling capacitor 660c are similarly calculated by the equation (1).

By the way, in a conventional solid-sate image sensing apparatus, capacitance per unit area of the clamp capacitor 610, the sampling capacitors 660a, 660b and 660c are some $fF/\mu m^2$. Therefore, in the case of forming a capacitor of some pF, the area of the signal processing unit 550 is enlarged and the circuit formed to sum pixel signals enlarges the chip area. For example, when Ccp and Csp are 5 pF and the capacitance per unit area of the sampling capacitors 660a, 660b and 660c is 5 $fF/\mu m^2$, the each area of the clamp capacitor 610, the sampling capacitors 660a, 660b and 660c is 1,000 $\mu m^2$, which means the total is a large area of 4,000 $\mu m^2$. Consequently, the capacitor length is 1,000 μm when the capacitor width in the horizontal direction of the clamp capacitor and the sampling capacitor is formed by 4 μm.

However, when a conventional solid-state image sensing apparatus does not sum the signal voltage, but accumulates the signal voltage using any of the sampling capacitors 660a, 660b and 660c and outputs the accumulated signal voltage to the horizontal signal line 570, the smaller the sampling capacitance Csp is, the more susceptible is the outputted signal voltage to an external noise caused by ON/OFF of the column selection transistor 650. Therefore, to restrain the influence of the external noise, it is unavoidable that the sampling capacitance Csp becomes large and there is a problem that the chip area enlarges. For example, when the gate capacitor of the column selection transistor has 4 fF (it is supposed that the gate size is about W/L=5 μm/1 μm and half of the gate capacitor has influenced as the external noise to the sampling capacitor) and pulse voltage of 3V is applied to the column selection transistor, voltage of 3V×4 f/(4 f+Csp) will jump into the signal voltage accumulated in the sampling capacitor in calculation. Consequently, if the signal voltage of 500 mV is accumulated in the sampling capacitor as a saturating signal, to make an S/N ratio of the external noise to the signal voltage−40 dB or less, when the sampling capacitor is the sampling capacitor>>the gate capacitor and the pulse voltage is VIN, it is necessary to satisfy the following equation: the saturating signal voltage/100>VIN×the gate capacitor/the sampling capacitor. Therefore, large capacitance of sampling capacitor of about 2.4 pF or more, about 600 times as large as capacitance of the gate capacitor affected by the external noise, is necessary. Additionally, when about 10% of the above-mentioned external noise is generated among the column selection transistors as unevenness of the external noise, large sampling capacitor, same value of about 2.4 pF or more, is necessary to make the S/N ratio at the time −60 dB or less.

Additionally, when the signals are not summed in the conventional solid-state image sensing apparatus, if a method of using simply a plurality of sampling capacitors is employed, a problem that circuit gain significantly reduces occurs. In other words, when the signals are not summed, and the signals are accumulated using, for example, 3 sampling capacitors, the sensibility of reading out the signals to the horizontal signal line 570 through the column selection transistor 650 is 3 Csp/(3Csp+Ccom) if the capacitance of a common signaling line is Ccom. It is improvement compared with Csp/(Csp+Ccom), the circuit gain at this part when one sampling capacitor is used. However, the gain based on the equation (1) is, on the contrary, Ccp/(Ccp+3Csp); the circuit gain reduces compared with Ccp/(Ccp+Csp) when one sampling capacitor is used; and transmission efficiency deteriorates. At this time, it is possible to restrain the reduction of the circuit gain calculated by the equation (1) by enlarging Ccp, the capacitance of the clamp capacitor for capacitance of the sampling capacitor. However, since Ccp, the capacitance of the clamp capacitor at the time, becomes a large value of several pF to several tens of pF, the problem that the chip area enlarges occurs. For example, to equalize the gain, in the case of increasing capacitance of the clamp capacitor by 10 pF because the sampling capacitor to be used has increased, it is necessary to increase the capacitor length by further 500 μm. Additionally, it is possible to make the circuit gain when signals of three sampling capacitors are read out at the same time three times larger by making Csp>>Ccom and Ccp>>Csp than the circuit gain in the case of not making Csp>>Ccom and Ccp>>Csp. However, since the capacitance of the horizontal common signal line is several pF several tens of pF, capacitance of the clamp capacitor Ccp and capacitance of the sampling capacitor Csp becomes extremely large and it is not realistic that the above-mentioned conditions hold. Further, when nondestructive read of signals from a pixel is possible and the signals are not summed, by reading out each sampling capacitors plural times as if the signals are summed, the above-mentioned circuit gain becomes Ccp/(Ccp+Csp) and the gain reduction does not occur. However, to read out plural times, a problem that the readout time is three times as long as usual occurs.

SUMMARY OF THE INVENTION

Accordingly, in view of the foregoing, it is the object of the present invention to provide a solid-state image sensing apparatus which can improve the S/N ratio in the mode in which pixel signals are not summed and the mode in which pixel signals are summed, without enlarging the chip area.

In order to achieve the object, the solid-state image sensing apparatus is a solid-state image sensing apparatus comprising: an image sensing unit in which a plurality of unit cells is laid out on a semiconductor substrate two-dimensionally, each unit cell composing a photoelectric conversion unit operable to convert light into charge and an amplification unit which amplifies an output from the photoelectric conversion unit and outputs an amplified signal; a plurality of vertical signal lines through which the amplified signals from the unit cells are transmitted in a column direction; a horizontal direction selection unit operable to select a row of unit cells from the plurality of unit cells laid out in the image sensing region; a first accumulation capacitor and a second accumulation capacitor which are connected to a vertical signal line for each column and accumulate a signal corresponding to the amplified signal of the unit cell for each row; an accumulation capacitor selection unit operable to select a capacitor which accumulates the signal from the first accumulation capacitor and the second accumulation capacitor; a vertical direction selection unit operable to select the first accumulation capacitor and the second accumulation capacitor connected to an arbitrary vertical signal line from the first accumulation capacitors and the second accumulation capacitors connected to each of the plurality of vertical signal lines; and a horizontal signal line which is connected to a vertical signal line for each column through the vertical direction selection unit and transmits a signal corresponding to the amplified signal accumulated in the first accumulation capacitor or the second accumulation capacitor, wherein the accumulation capacitor selection unit selects the first accumulation capacitor when a sum of the amplified signals of the unit cells in the plurality of rows is performed, and selects the second accumulation capacitor when the sum is not performed, a capacitance of the first accumulation capacitor is smaller than a capacitance of the second accumulation capacitor, and the capacitance of the second accumulation capacitor is a least capacitance required to read out the signal accumulated in said second accumulation capacitor. Here, the capacitance of the second accumulation capacitor may be a capacitance required to eliminate an external noise from the vertical direction selection unit. Additionally, the first accumulation capacitor and the second accumulation capacitor may be made of n (n is 2 or a larger integer) pieces of third accumulation capacitors connected in parallel, and the accumulation capacitor selection unit may select: m (m≦n/k, where m is 1 or a larger integer) pieces of third accumulation capacitors when a sum of the amplified signal of the unit cell in k (k≦n, where k is 2 or a larger integer) rows is performed; p (m<p≦n, where p is 2 or a larger integer) pieces of third accumulation capacitors, when the sum is not performed; and all the third capacitors which include signals, when the signals accumulated in the third capacitors are read out. The accumulation capacitor selection unit may select the third accumulation capacitor k times when the sum is performed, and the m may be the same value in the k times of selection of the third accumulation capacitor. The smaller of a total capacitance of the k×m pieces of the third accumulation capacitors and a total capacitance of p pieces of the third accumulation capacitors may be larger than predetermined times of a parasitic capacitance of the vertical direction selection unit, and a value of the predetermined times of the parasitic capacitance may be determined by voltage of a signal for a selection by the vertical direction selection unit and voltage of a signal read out from the third accumulation capacitance. The m may be 1 and the n may be equal to the k and the p. The accumulation capacitor selection unit may select the third accumulation capacitor k times when the sum is performed, and the m may be different value in the k times of selection of the third accumulation capacitor.

Accordingly, it is possible to improve the S/N ratio in the mode in which pixel signals are not summed and the mode in which pixel signals are summed, without enlarging the chip area.

Additionally, the third accumulation capacitor may be connected with the vertical signal line through a clamp capacitor.

Accordingly, it is possible to remove fixed pattern noises which are different for each unit cell.

Moreover, the capacitance of the third accumulation capacitor may be determined so that an S/N ratio in a case when the sum is performed and an S/N ratio in a case when the sum is not performed are equal.

Accordingly, it is possible to provide a method for optimizing the capacitance of the accumulation capacitor.

Additionally, the capacitance of the third accumulation capacitor may be determined by a following equation, $$Ccp:Csp \approx (1-1\sqrt{k}):(\sqrt{k}-1)$$

where Ccp is a capacitance of a clamp capacitor, Csp is a capacitance of the third accumulation capacitor and k is the number of rows to be summed.

Accordingly, it is possible to optimize the capacitance of the accumulation capacitor.

Moreover, the third accumulation capacitor, the horizontal direction selection unit and the vertical direction selection unit may be composed of n-type MOS transistors.

Accordingly, since the column selection transistor is composed of the n-type MOS transistor which has low ON resistance at the time of selecting the column, it is possible to make the gate size of the column selection transistor smaller and to reduce the influence of the external noise from the column selection transistor. Additionally, since the capacitor is composed of the n-type MOS transistor, it is possible to make response characteristic faster. Further, since the capacitor can be formed from one layer of polysilicon not from two layers of polysilicon, it is possible to simplify the manufacturing process.

By the solid-state image sensing apparatus according to the present invention, it is not necessary to prepare an accumulation capacitor which has a large capacitance in order to sum signal voltage of the unit cell, it is possible to compress images without deteriorating the image quality and enlarging the chip area. Additionally, it is possible to improve the S/N ratio in both of the mode in which pixel signals are summed and the mode in which pixel signals are not summed. Moreover, since it is possible to select the case of summing the signal voltage of the unit cells or the case of not summing signal voltage of the unit cells, it is possible to provide a solid-state image sensing apparatus which corresponds to the case when high pixel value is necessary and the case when minimum pixel value is necessary. Additionally, it is possible to optimize the capacitance of the accumulation capacitor to accumulate the signal voltage of the unit cells.

Accordingly, it is possible by the present invention to provide a solid-state image sensing apparatus which can compress images without enlarging the chip area and without deteriorating the image quality by a cull. It is also possible to improve the quality of a still image by a camera of a mobile terminal and the camera can correspond to animation and communication. Therefore, its practical value is high.

As further information about technical background to this application, Japanese patent application No. 2003-78890 filed on Mar. 20, 2003 and Japanese patent application No. 2004-41266 filed on Feb. 18, 2004 are incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7 is a drive timing chart showing operations of the amplifying-type solid-state image sensing apparatus when the signal voltage of the unit cells 500 is summed.

DESCRIPTION OF THE PREFERRED EMBODIMENT(S)

The amplifying-type solid-state image sensing apparatus according to the embodiment of the present invention will be explained below with reference to the figures.

Figure 1:
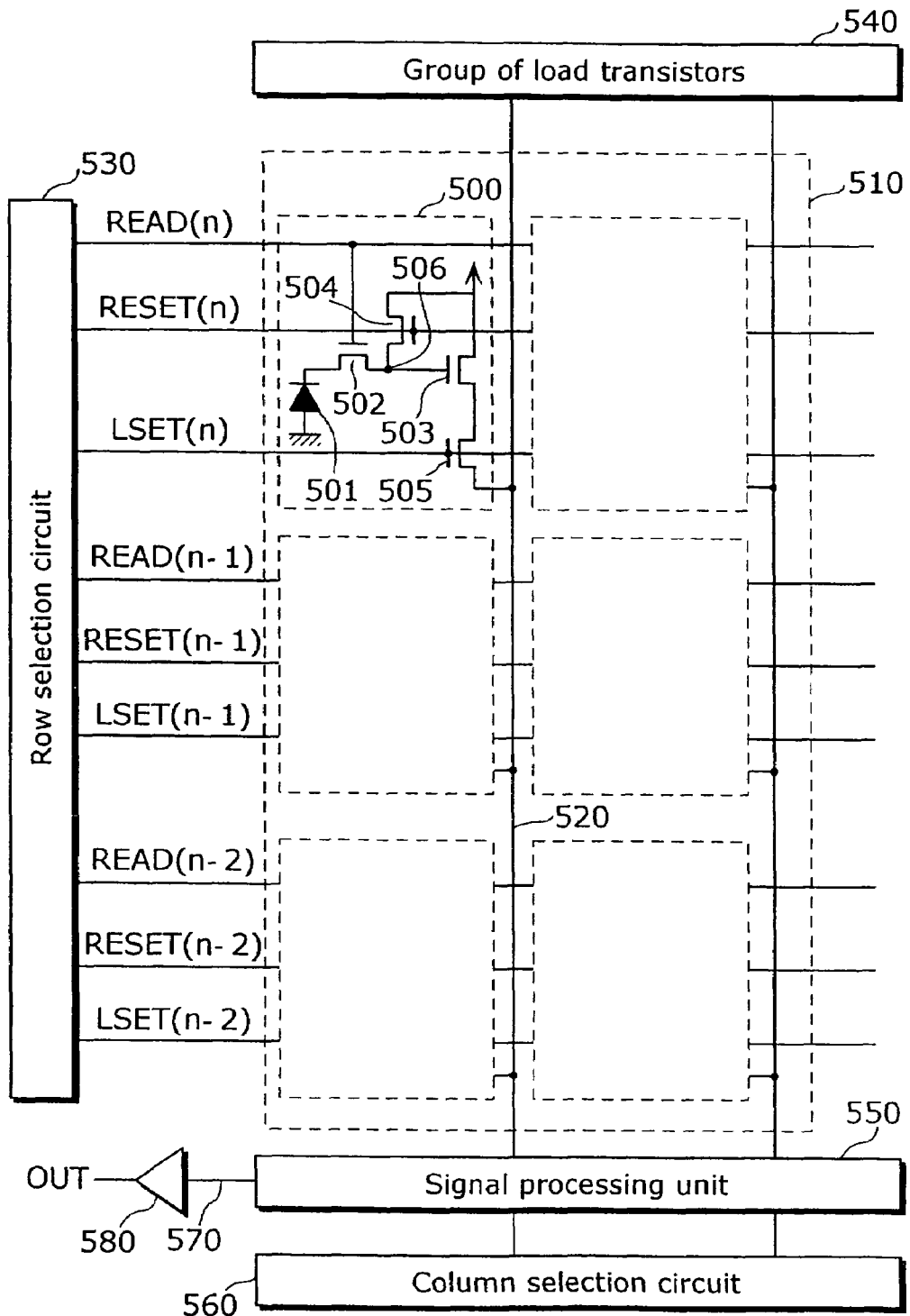
FIG. 1 is a diagram showing the circuit structure of a conventional solid-state image sensing apparatus.
Figure 4:
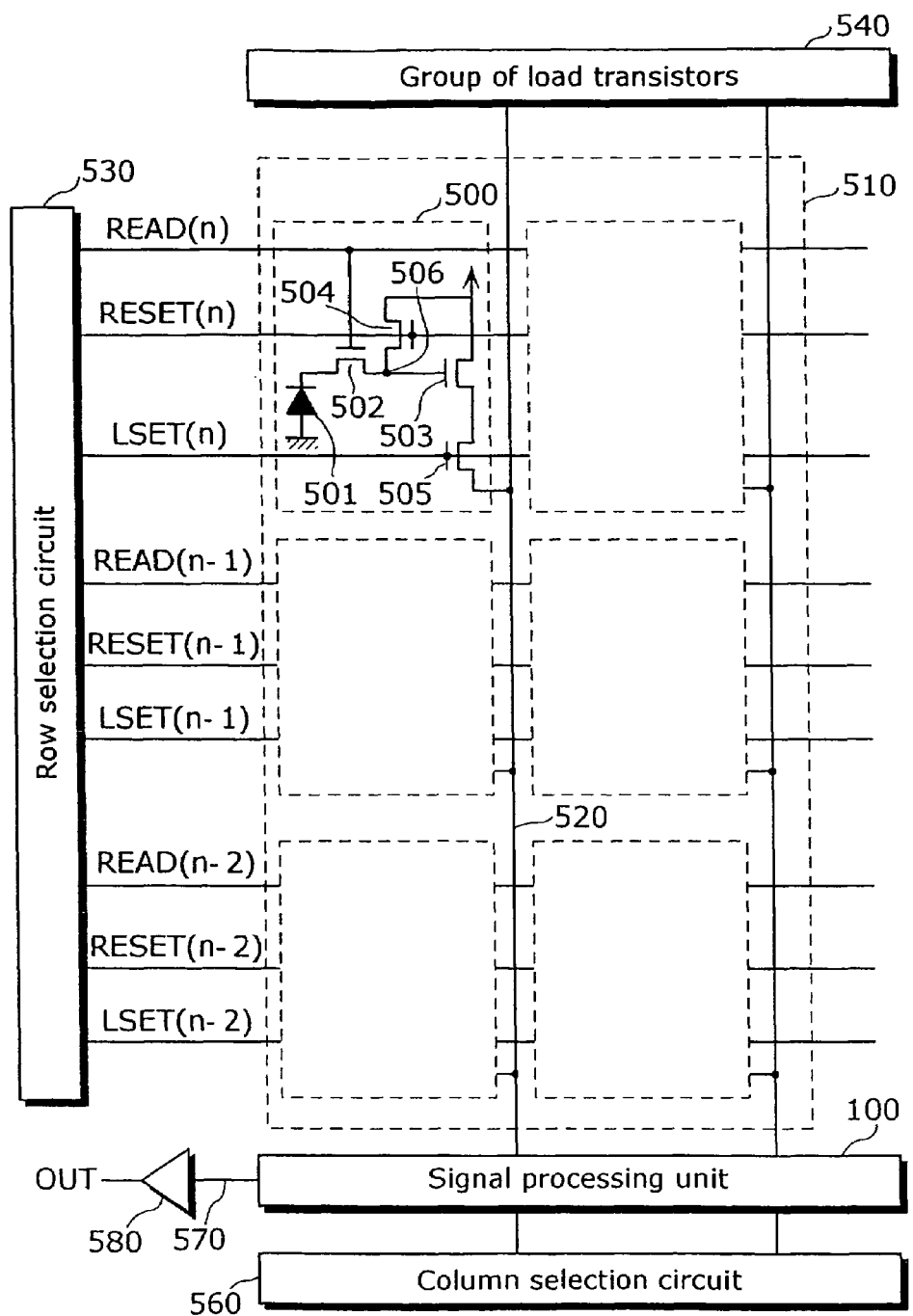
FIG. 4 is a diagram showing the circuit structure of the amplifying-type solid-state image sensing apparatus according to the embodiment of the present invention.

FIG. 4 is a diagram showing the circuit structure of the amplifying-type solid-state image sensing apparatus according to the present embodiment. It should be noted that in FIG. 4, the same reference numbers are assigned to the same elements in FIG. 1 and their detailed explanations are omitted here.

The amplifying-type solid-state image sensing apparatus according to the present embodiment aims to realize an amplifying-type solid-state image sensing apparatus which enables to improve the S/N ratio, without enlarging the chip area, in both of a mode in which pixel signals are summed and a mode in which pixel signals are not summed. The amplifying-type solid-state image sensing apparatus according to the present embodiment has a different signal processing unit from the conventional solid-state image sensing apparatus and includes a signal processing unit 100, the unit cell 500, an image area 510, the first vertical signal line 520, the row selection circuit 530, a group of load transistors 540 connected to the first vertical signal line 520, the column selection circuit 560, the horizontal signal line 570 and the output amplifier 580 connected to the horizontal signal line 570. In FIG. 4, to simplify an explanation, the unit cell 500 in the "n"th row and the "m"th column is shown.

The unit cell 500 is composed of a photodiode 501 which converts a light signal to signal charge, a readout transistor 502 which reads out the signal of the photodiode 501, an amplifier transistor 503 which amplifies the signal voltage of the photodiode 501, a reset transistor 504 which resets the signal voltage of the photodiode 501, a vertical selection transistor 505 which selects the row from which the amplified signal voltage is read out, an FD unit 506 which detects the signal voltage of the photodiode 501.

Figure 2:
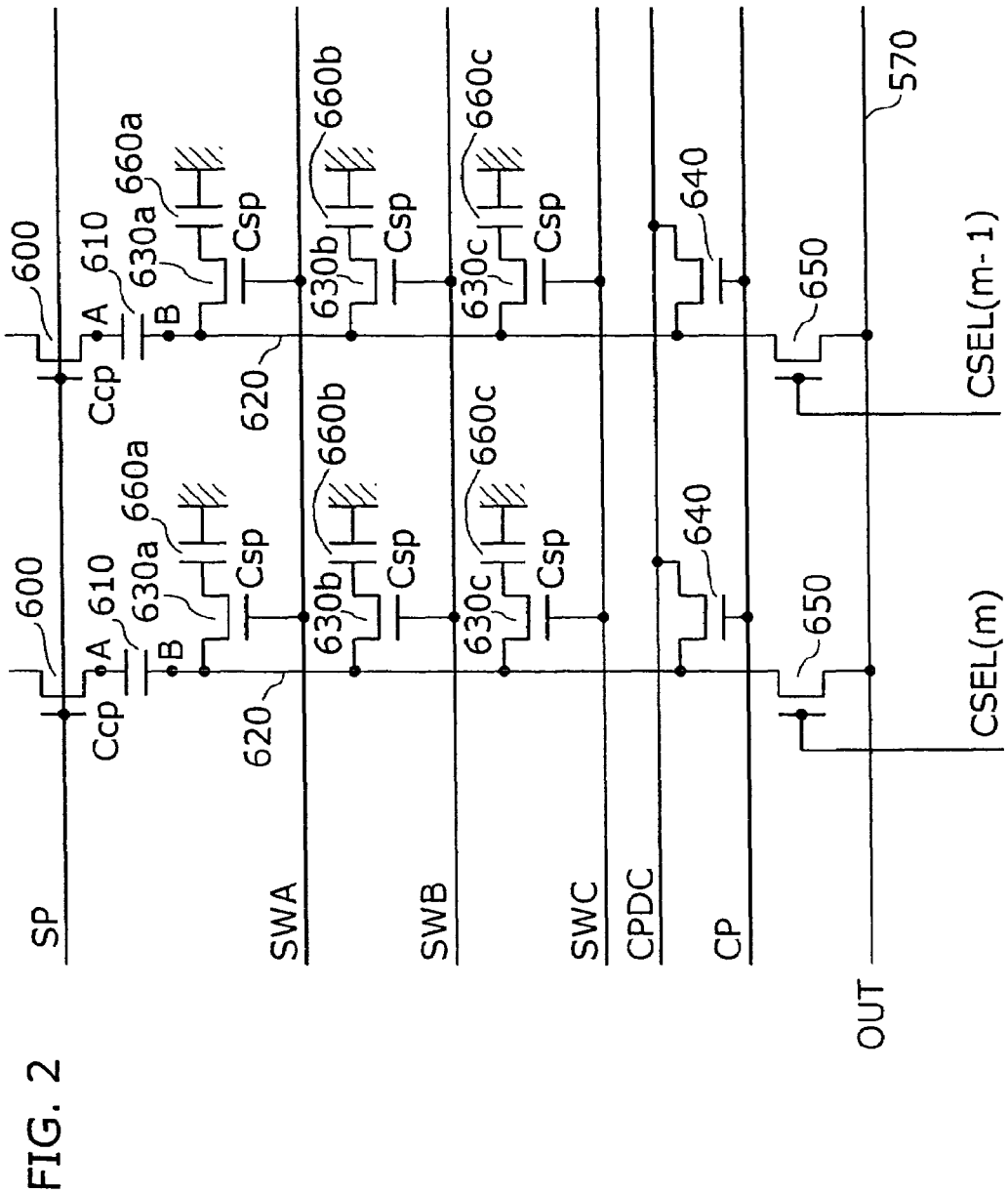
FIG. 2 is a diagram showing the circuit structure of the signal processing unit 550 of the conventional solid-state image sensing apparatus.
Figure 3:
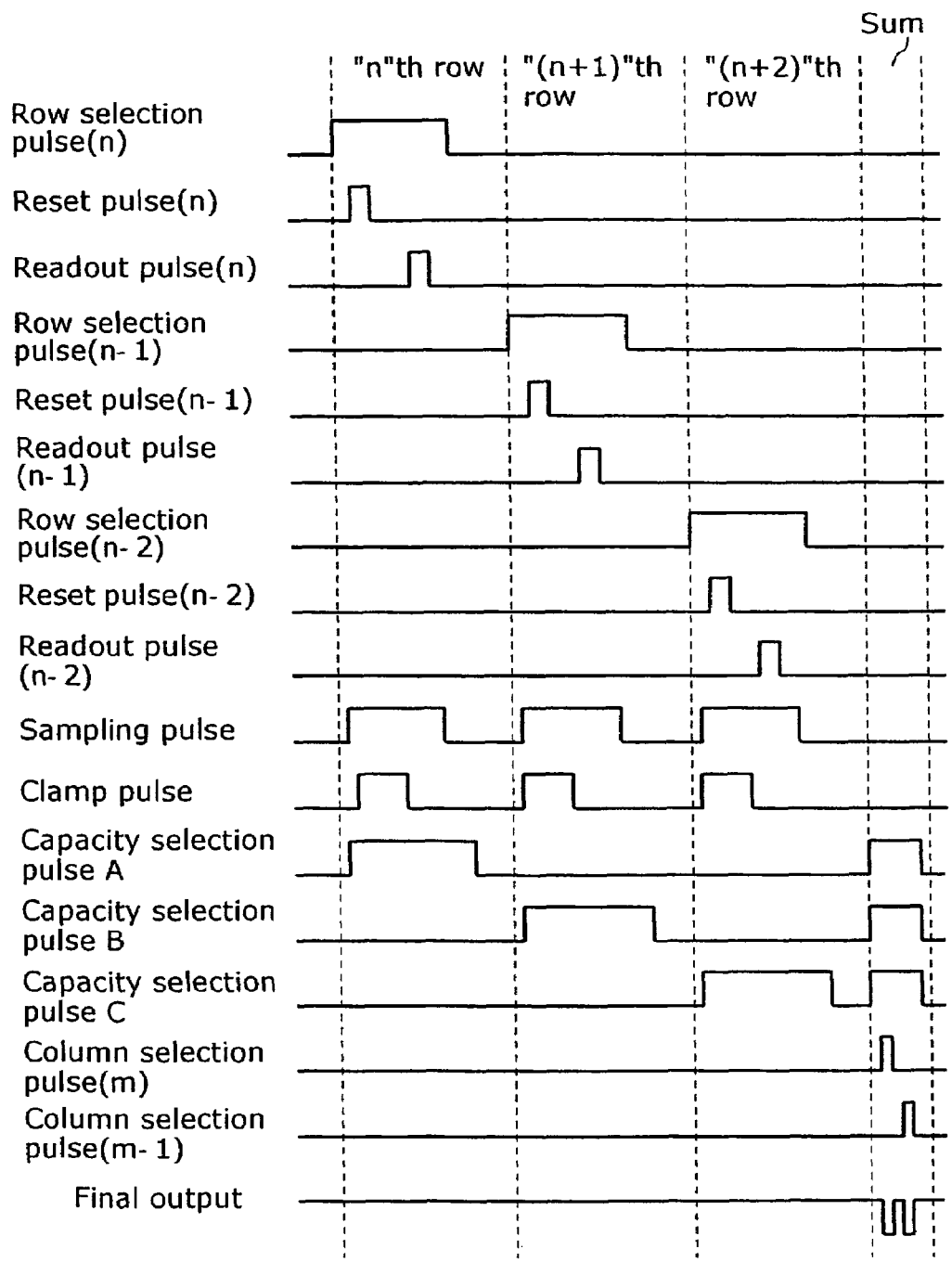
FIG. 3 is a drive timing chart showing operations of the conventional solid-state image sensing apparatus.
Figure 5:
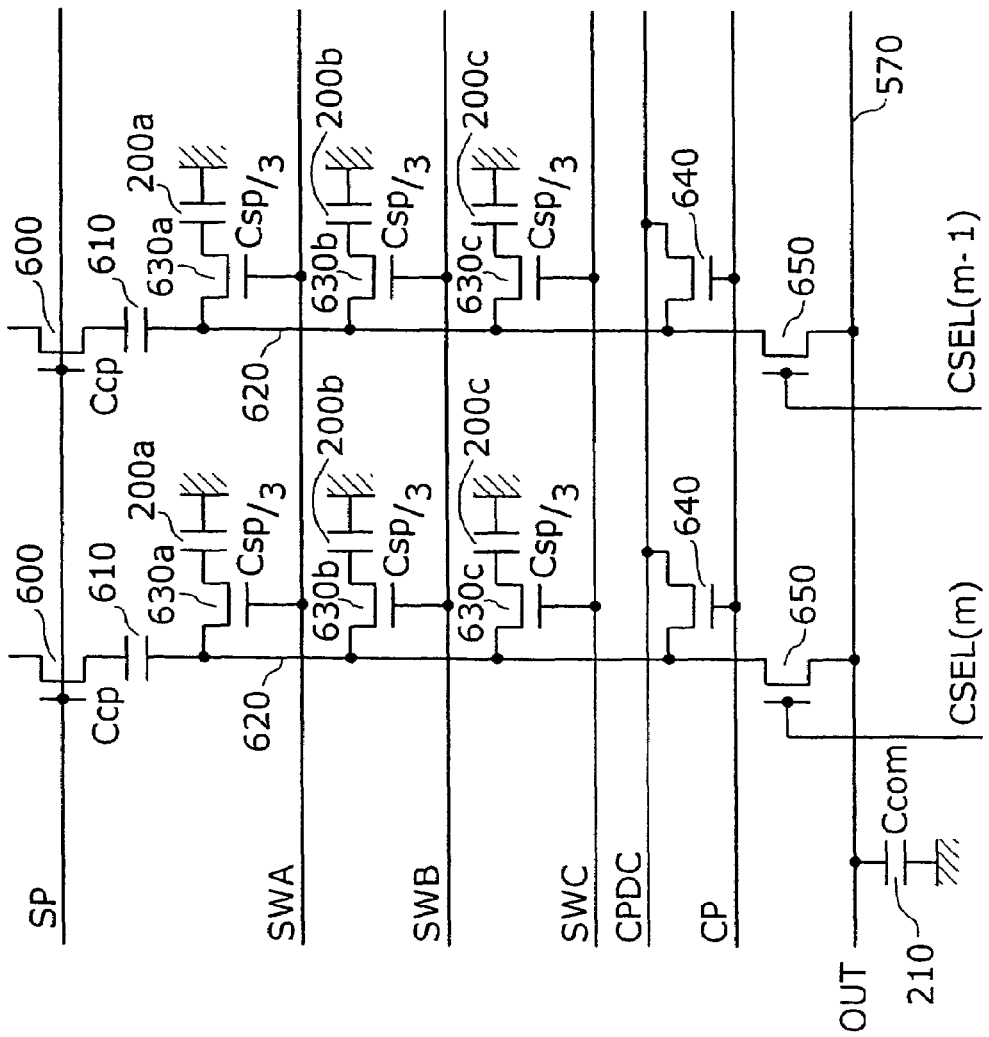
FIG. 5 is a diagram showing the circuit structure of the signal processing unit 100 of the amplifying-type solid-state image sensing apparatus.

Here, the circuit structure of the signal processing unit 100 is shown in FIG. 5. It should be noted that in FIG. 5, the same reference numbers are assigned to the same elements in FIG. 2 and their detailed explanations are omitted here.

The signal processing unit 100 has different sampling capacitors from the conventional solid-state image sensing apparatus and is composed of: a sample hold transistor 600 connected to the first vertical signal line 520; a clamp capacitor 610 connected to the first vertical signal line 520 though the sample hold transistor 600; the second vertical signal line 620 connected to the first vertical signal line 520 through the clamp capacitor 610; sample transistors 630a, 630b and 630c connected to the second vertical signal line 620; a clamp transistor 640; a row selection circuit 650; a sampling capacitor 200a connected to the second vertical signal line 620 through the sampling transistor 630a; a sampling capacitor 200b connected to the second vertical signal line 620 through the sampling transistor 630b; a sampling capacitor 200c connected to the second vertical signal line 620 through the sampling transistor 630c; a horizontal signal line capacitor 210 connected to the horizontal signal line 570.

The sampling capacitors 200a, 200b and 200c accumulate the signal voltage read out for each row, respectively. For example, the sampling capacitor 200a accumulates the signal voltage read out from the unit cell 500 in the "n"th row; the sampling capacitor 200b accumulates the signal voltage read out from the unit cell 500 in the "(n−1)" th row; and the sampling capacitor 200c accumulates the signal voltage read out from the unit cell 500 in the "(n−2)" th row. Here, the capacitance of the sampling capacitor 200a is Csp/3; the capacitance of the sampling capacitor 200b is Csp/3; and the capacitance of the sampling capacitor 200c is Csp/3. Csp which is a total of capacitance of each sampling capacitor is the capacitance required to read out the signal voltage accumulated in each sampling capacitor into the horizontal signal line 570. In other words, Csp is the capacitance required to absorb the external noise from the column selection transistor 650.

The horizontal signal line capacitor 210 represents a stray capacitance formed by the column selection transistor 650 and the horizontal signal line 570. Here, the capacitance of the horizontal signal line capacitor is Ccom.

Figure 6:
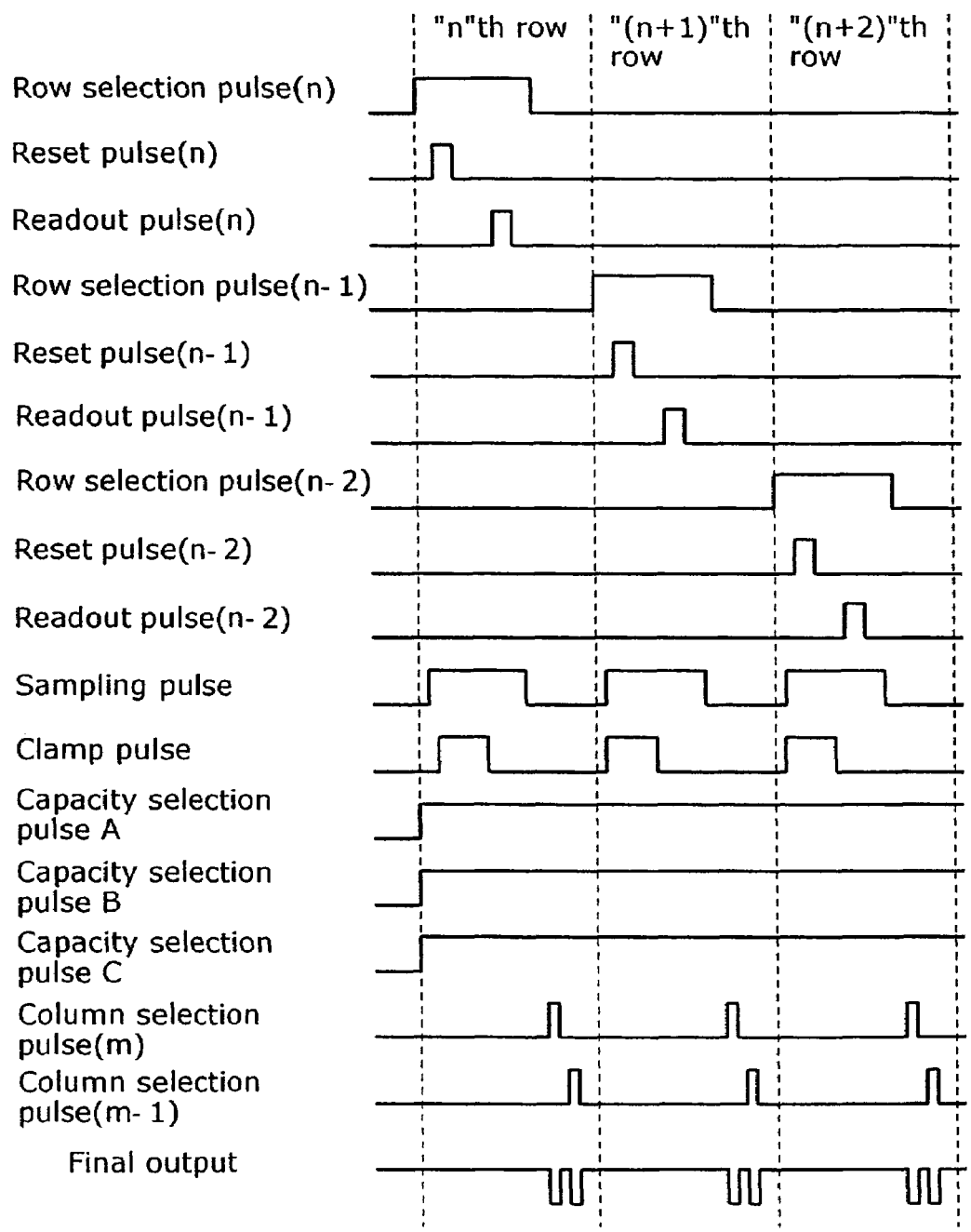
FIG. 6 is a drive timing chart showing operations of the amplifying-type solid-state image sensing apparatus when the signal voltage of the unit cells 500 is not summed.

Operations of the solid-state image sensing apparatus of the present invention with a structure described above (when the signal voltage of the unit cell 500 is not summed) are explained based on a drive timing chart shown in FIG. 6.

When the unit cell 500 in the "n"th row is selected, a row selection pulse (n) which makes the LSET (n) line high level is applied to a vertical selection transistor 505 in the "n"th row. As a result, the vertical selection transistor 505 becomes ON state; the amplifier transistor 503 and the group of load transistors 540 form a source follower circuit; and voltage which follows power supply voltage of the unit cell 500 is outputted from the source follower circuit to the first vertical signal line 520.

Next, the sampling pulse which makes the SP line high level is applied to the sample hold transistor 600. As a result, the sample hold transistor 600 becomes ON state and holds the voltage outputted from the source follower circuit to the first vertical signal line 520 in the clamp capacitor 610. At this time, the clamp pulse which makes the CP line high level is applied to the clamp transistor 640. As a result, the clamp transistor becomes ON state; the clamp capacitor at the side connected to the second vertical signal line 620 is reset to electric potential of the CPDC line. Additionally, the capacitor selection pulse A which makes the SWA line always high level, the capacitor selection pulse B which makes the SWB line always high level and the capacitor selection pulse C which makes the SWC line always high level are applied at the same time. As a result, the sampling transistors 630a, 630b and 630c become always ON state and the sampling capacitors 200a, 200b and 200c are reset to the electric potential of the CPDC line.

Next, a reset pulse (n) which makes a RESET (n) line high level is applied to the reset transistor 504. As a result, the reset transistor 504 becomes ON state and electric potential of the FD unit 506 is reset. The gate voltage of the amplifier transistor 503 connected to the FD unit 506 becomes the electric potential of the FD unit 506 and the voltage corresponding to this voltage, concretely the voltage given by (the electric potential of the FD unit−Vt)×a is outputted to the first vertical signal line 520.

Next, a clamp pulse which makes the CP line low level is applied to the clamp transistor 640. As a result, the clamp transistor 640 becomes OFF state and the second vertical signal line 620 becomes floating state.

Next, a readout pulse (n) which makes a READ (n) line high level is applied to the readout transistor 502. As a result, the readout transistor 502 becomes ON state and signal charge accumulated in the photodiode 501 is transferred to the FD unit 506. The gate voltage of the amplifier transistor 503 connected to the FD unit 506 becomes the electric potential of the FD unit 506 and approximately same voltage as the gate voltage is outputted to the first vertical signal line 520. At this time, the clamp pulse which makes the CP line low level is applied to the clamp transistor 640 and the clamp transistor becomes OFF state and in the sampling capacitors 200a, 200b and 200c is accumulated, as the signal voltage of the unit cell 500 in the "n"th row, the difference between the voltage outputted to the first vertical signal line 520 when the electric potential of the FD unit 506 is reset and the voltage outputted to the first vertical signal line 520 when the signal charge accumulated in the photodiode 501 is transferred to the FD unit 506.

Next, the column selection pulse (m) which makes the CSEL (m) line high level, the column selection pulse (m−1) which makes CSEL (m−1) line high level and so on are applied to the column selection transistor 650 in sequence. As a result, each column selection transistor 650 becomes ON state in sequence, the signal voltage accumulated in the sampling capacitors 200a, 200b and 200c are outputted to the horizontal signal line 570 in sequence.

Gain of the signal processing unit 100 based on the operations described above when the signal voltage of the unit cell 500 is not summed is calculated as follows.

First, in order to accumulate the signal voltage of the unit cell 500 in the "n"th row in the sampling capacitors 200a, 200b and 200c, the clamp transistor 640 and the column selection transistor 650 become OFF state; the sampling transistors 630a, 630b and 630c become ON state at the same time. The gain of the circuit formed by the clamp capacitor 610 and sampling capacitors 200a, 200b and 200c is calculated and expressed by the equation (2).

$$G3 = Ccp/(Ccp+Csp) \quad (2)$$

Next, in order to output the signal voltage of the unit cell 500 to the horizontal signal line 570, the sample hold transistor 600 and the clamp transistor 640 become OFF state; the column selection transistor 650 and the sampling transistors 630a, 630b and 630c become ON state. The gain of the circuit formed by the sampling capacitors 200a, 200b, 200c and the horizontal signal line capacitor 210 is calculated and expressed by the equation (3).

$$G4 = Csp/(Csp+Ccom) \quad (3)$$

Then, the gain of the signal processing unit 100, when the signal voltage of the unit cell 500 is not summed, is calculated by G3 and G4 obtained from the equation (2) and the equation (3), and expressed by the equation (4).

$$G = G3 \times G4 = (Ccp/(Ccp+Csp)) \times (Csp/(Csp+Ccom)) \quad (4)$$

Next, operations of the amplifying-type solid-state image sensing apparatus according to the embodiment of the present invention (when the signal voltage of the unit cell 500 is summed) are explained based on a drive timing chart shown in FIG. 7.

When the unit cell 500 in the "n"th row is selected, the row selection pulse (n) which makes the LSET (n) line high level is applied to the vertical selection transistor 505 in the unit cell 500 in the "n"th row. As a result, the vertical selection transistor 505 becomes ON state; the amplifier transistor 503 and the group of load transistors 540 form a source follower circuit; and voltage which follows power supply voltage of the unit cell 500 is outputted from the source follower circuit to the first vertical signal line 520.

Next, the sampling pulse which makes the SP line high level is applied to the sample hold transistor 600. As a result, the sample hold transistor 600 becomes ON state and holds the voltage outputted from the source follower circuit to the first vertical signal line 520 in the clamp capacitor 610. At this time, the clamp pulse which makes the CP line high level is applied to the clamp transistor 640. As a result, the clamp transistor becomes ON state; the clamp capacitor 610 is reset to electric potential of the CPDC line. Additionally, since a capacitor selection pulse A which makes the SWA line high level is applied at the same time, the sampling transistor 630a becomes ON state and the sampling capacitor 200a is reset to the electric potential of the CPDC line.

Next, a reset pulse (n) which makes the RESET (n) line high level is applied to the reset transistor 504. As a result, the reset transistor 504 becomes ON state and the electric potential of the FD unit 506 is reset. The gate voltage of the amplifier transistor 503 connected to the FD unit 506 becomes the electric potential of the FD unit 506 and the voltage corresponding to this voltage, concretely the voltage given by (the electric potential of the FD unit–Vt)×a is outputted to the first vertical signal line 520.

Next, a clamp pulse which makes the CP line low level is applied to the clamp transistor 640. As a result, the clamp transistor 640 becomes OFF state and the second vertical signal line 620 becomes floating state.

Next, a readout pulse (n) which makes a READ (n) line high level is applied to the readout transistor 502. As a result, the readout transistor 502 becomes ON state and signal charge accumulated in the photodiode 501 is transferred to the FD unit 506. The gate voltage of the amplifier transistor 503 connected to the FD unit 506 becomes the electric potential of the FD unit 506 and approximately same voltage as the gate voltage is outputted to the first vertical signal line 520. At this time, the clamp pulse which makes the CP line low level is applied to the clamp transistor 640 and the clamp transistor becomes OFF state and in the sampling capacitor 200a is accumulated, as the signal voltage of the unit cell 500 in the "n"th row, the difference between the voltage outputted to the first vertical signal line 520 when the electric potential of the FD unit 506 is reset and the voltage outputted to the first vertical signal line 520 when the signal charge accumulated in the photodiode 501 is transferred to the FD unit 506. Then, a capacitor selection pulse A which makes the SWA line low level is applied to the sampling transistor 630a and the sampling transistor 630a becomes OFF state.

Next, the unit cell 500 in the "(n−1)"th row is selected; the capacitor selection pulse B which makes the SWB line high level is applied; similar operations are repeated; and in the sampling capacitor 200b is accumulated the signal voltage of the unit cell 500 in the "(n−1)"th row. Then, the capacitor selection pulse B which makes the SWB line low level is applied to the sampling transistor 630b and the sampling transistor 630b becomes OFF state.

Next, the unit cell 500 in the "(n−2)"th row is selected; the capacitor selection pulse C which makes the SWC line high level is applied; similar operations are repeated; and in the sampling capacitor 220c is accumulated the signal voltage of the unit cell 500 in the "(n−2)" row. Then, the capacitor selection pulse C which makes the SWC line low level is applied to the sampling transistor 630c and the sampling transistor 630c becomes OFF state.

Next, the capacitor selection pulse A, the capacitor selection pulse B and the capacitor selection pulse C are applied at the same time to make the SWA line, and the SWB line and SWC line high level, respectively. As a result, sampling transistors 630a, 630b and 630c become ON state.

Next, the column selection pulse (m) which makes the CSEL (m) line high level, the column selection pulse (m−1) which makes the CSEL (m−1) line high level and so on are applied to the column selection line 650 in sequence. As a result, each column selection transistor 650 becomes ON state in sequence, signal voltage accumulated in the sampling capacitor 200a, the sampling capacitor 200b and the sampling capacitor 200c are summed and outputted to the horizontal signal line 570 in sequence.

When the signal voltage of the unit cell 500 is summed based on the operations described above, the gain of the signal processing unit 100 is calculated as follows.

First, to accumulate the signal voltage of the unit cell 500 in the "n"th row in the sampling capacitor 200a, the clamp transistor 640 and the column selection transistor 650 become OFF state and the sampling transistor 630a becomes ON state. The gain of the circuit formed by the clamp capacitor 610 and the sampling capacitor 200a is calculated and expressed by the equation (5).

$$G5 = Ccp/(Ccp + Csp/3) \quad (5)$$

For example, when Csp and Ccp are 5 pF, the gain of the signal processing unit 550 is calculated using the equation (5) and is about 0.75. This value is 50% larger than the gain of a conventional solid-state image sensing apparatus.

Here, to accumulate the signal voltage of the unit cells 500 in the "(n−1)"th row and the "(n−2)"th row in the sampling capacitors 200b and 200c, the gain of the circuit formed by the clamp capacitor 610 and the sampling capacitor 200b and the gain of the circuit formed by the clamp capacitor 610 and the sampling capacitor 200c are similarly calculated and expressed by the equation (5).

Next, in order to output the summed signal voltage of the unit cells 500 in "n"th, "(n−1)"th and "(n−2)"th rows to the horizontal signal line 570, the sample hold transistor 600 and the clamp transistor 640 become OFF state; the column selection transistor 650 and the sampling transistors 630a, 630b and 630c become ON state; and the gain of the circuit formed by the sampling capacitors 200a, 200b, 200c and the horizontal signal line capacitor 210 is calculated and expressed by the equation (6). By the way, in the equation (6), since the signal voltage accumulated in the sampling capacitors 200a, 200b and 200c is read out to the horizontal signal line at the same time, the capacitance Csp required to read out the signal voltage accumulated in the sampling capacitors to the horizontal signal line 570 is reserved.

$$G6 = Csp/(Csp + Ccom) \quad (6)$$

The signal voltage of the unit cell 500 when the sum is performed is calculated using G5 and G6 obtained from the equation (5) and the equation (6) and expressed by the equation (7).

$$G=G5 \times G6=(Ccp/(Ccp+Csp/3)) \times (Csp/(Csp+Ccom)) \quad (7)$$

By the way, to obtain sufficient gain of the signal processing unit 100, it is desirable that the capacitance Ccom of the horizontal signal line capacitor 210 is equivalent to the total capacitance Csp of the sampling capacitor and the capacitance Ccp of the clamp capacitance, and therefore, Ccom, Csp and Ccp have, for example, the relationship expressed by the equation (8).

$$Ccom=Csp=Ccp \quad (8)$$

When Csp and Ccom are 5 pF, the gain of the signal processing unit 550 is calculated based on the equation (7) and the equation (8) and is about 0.38.

As is described above, according to the present embodiment, the gain of the circuit formed to accumulate, in the sampling capacitor 200a, the signal voltage of the unit cell 500 calculated by the equation (5) has a large value; additionally, the gain of the signal processing unit 550 calculated by the equation (7) based on the gain of the circuit is also has a large value; and the sum of the capacitance of three sampling capacitors 200a, 200b and 200c prepared to sum the signal voltage of the unit cell 500 is small. Consequently, since it is possible to sum the signal voltage of the unit cell 500 without providing a sampling capacitor which has a large capacitance, in other words, a large area, the amplifying-type solid-state image sensing apparatus according to the present embodiment can sum the signal voltage of the unit cell 500 without enlarging the chip area. Additionally, it is possible to improve the S/N ratio both in a mode in which pixel signals are summed and in a mode in which pixel signals are not summed. For example, when Csp is 5 pF, Ccp is 5 pF, and the capacitance per unit area of the sampling capacitors 200a, 200b and 200c is 5 fF/μm², the gain of the circuit formed to accumulate the signal voltage of the unit cell 500 in the sampling capacitor 660a is a small value of 0.5 in a conventional solid-state image sensing apparatus but a significantly large value of 0.75 in the amplifying-type solid-state image sensing apparatus according to the present embodiment while the total area of the sampling capacitor is a large value of 3,000 μm² in a conventional solid-state image sensing apparatus but a small value of 1,000 μm² in the amplifying-type solid-state image sensing apparatus according to the present embodiment.

Additionally, by changing the capacitor selection pulse A, the capacitor selection pulse B and the capacitor selection pulse C, it is possible to choose summing or not summing the signal voltage of the unit cell 500. Therefore, the amplifying-type solid-state image sensing apparatus according to the present embodiment can respond to both of summing or not summing the signal voltage of the unit cell 500.

Here, the S/N ratio (the signal to noise ratio), in the case of summing k rows (k is 2 or a larger integer) of the signal voltage of unit cell 500, improves in proportion to √k (the number of pixels summed) by light shot noise of photodiode 501. Therefore, if a certain noise Na exists in a rear end circuit including the output amplifier 580 and the output signal level S is supposed to be constant for both of summing or not summing the signal voltage of the unit cell 500, the S/N ratio when the signal voltage of 3 rows of the unit cells 500 is summed improves in proportion to √3. However, since it is not necessary that the S/N ratio in the case of summing the signal voltage of 3 rows of the unit cells 500 is unnecessarily better than the S/N ratio in the case of not summing the signal voltage of the unit cell 500, it is possible to optimize Csp by equalizing the S/N ratio in the case of summing the signal voltage of the unit cells 500 with the S/N ratio in the case of not summing the signal voltage of the unit cell 500.

Based on what is described above, the equation (9) to optimize Csp is derived. Here, in the equation (9), the left side is the gain in the case of summing the signal voltage of 3 rows of the unit cells 500; the right side is the gain, in the case of not summing the signal voltage of the unit cell 500, multiplied by √3 times which is necessitated in order to improve the circuit gain compared with the S/N ratio in the case of summing the signal voltage at the left side.

$$(Ccp/(Ccp+Csp/3)) \times (Csp/(Csp+Ccom)) = \sqrt{3} \times (Ccp/(Ccp+Csp)) \times (Csp/(Csp+Ccom)) \quad (9)$$

From the equation (9), an equation for giving the optimum value of Csp is acquired, and becomes the equation (10).

$$Ccp:Csp=(1-1/\sqrt{3}):(\sqrt{3}-1) \quad (10)$$

For example, when Ccp is 5 pF, Csp is about 8 pF from the equation (10).

By the way, in the present embodiment, the case of summing the signal voltage of 3 rows of unit cells 500 is exemplified. However, it is acceptable that by providing k (k is 2 or a larger integer) pieces of the sampling capacitors having Csp/3 based on the capacitance Csp optimized by the equation (11), the amplifying-type solid-state image sensing apparatus according to the present embodiment sums the signal voltage of k rows of the unit cell 500.

$$Ccp:Csp=(1-1/\sqrt{k}):(\sqrt{k}-1) \quad (11)$$

Additionally, since a gap of ±3 dB (=±√2) is within a permissible level in the S/N ratio, it is acceptable to optimize the ratio of Ccp and Csp within the range of $$(1-1/\sqrt{(k/2)}):(\sqrt{(K/2)}-1) \text{ and}$$

$$(1-1/\sqrt{(2k)}):(\sqrt{(2k)}-1),$$

in other words, within the range of ±3 dB (=±√2) as the ratio of Ccp and Csp.

As is described above, according to the present embodiment, it is possible to optimize Csp by equalizing the S/N ratio in the case of summing the signal voltage of the unit cells 500 with the S/N ratio in the case of not summing the signal voltage of the unit cells 500. Therefore, the amplifying-type solid-state image sensing apparatus according to the present embodiment can decide the most appropriate Csp in a solid-state image sensing apparatus corresponding to the case of summing the signal voltage of the unit cells 500 and the case of not summing the signal voltage of the unit cells 500.

By the way, in the solid-state image sensing apparatus according to the present embodiment, three sampling capacitors are connected to the second vertical signal line in parallel and when the signal voltage of unit cells of three rows is summed, after the signal voltage of the unit cell of each row is accumulated to one sampling capacitor three times, the signal voltage of the unit cells of three rows accumulated in three sampling capacitors are read out to the horizontal signal line at the same time. When the signal voltage of the unit cells is not summed, after the signal voltage of the unit cell for each row is accumulated to all the three sampling capacitors, the signal voltage of the unit cell of one row accumulated in three sampling capacitors is read out to the horizontal signal line at the same time. However, it is acceptable that when n (n≧k, where n is 2 or a larger integer) pieces of sampling capacitors are connected to the second vertical signal line in parallel and the signal voltage of the unit cells of k rows is summed and after accumulation of the signal voltage of the unit cell of each row to m (m≦n/k, where m is 1 or a larger integer) pieces of sampling capacitors is executed k times, the signal voltage of the unit cells of k rows is read out to the horizontal signal line at the same time. When the signal voltage of the unit cell is not summed, it is acceptable that after the signal voltage of the unit cell of each row is accumulated in p (m<p≦n, p is a integer which is 2 or more) pieces of sampling capacitors, the signal voltage of the unit cell of each row accumulated in the sampling capacitors is read out to the horizontal signal line at the same time. Here, m may or may not be the same value in the k times of accumulation to the sampling capacitors. Concretely, for example, there are modes like (1)~(6) below.

(1) When three sampling capacitors are connected to the second vertical signal line in parallel and the signal voltage of the unit cells of three rows is summed, after the accumulation of the signal voltage of the unit cell of each row to one sampling capacitor is executed three times, the signal voltage of the unit cells of three rows accumulated in three sampling capacitors are read out to the horizontal signal line at the same time. When the signal voltage of the unit cell is not summed, after the signal voltage of the unit cell of each row is accumulated in two sampling capacitors, the signal voltage of the unit cell of each row accumulated in the two sampling capacitors is read out to the horizontal signal line at the same time.

(2) When four sampling capacitors are connected to the second vertical signal line in parallel and the signal voltage of the unit cells of four rows is summed, after the accumulation of the signal voltage of the unit cell of each row to one sampling capacitor is executed four times, the signal voltage of the unit cells of four rows accumulated in four sampling capacitors are read out to the horizontal signal line at the same time. When the signal voltage of the unit cell is not summed, after the signal voltage of the unit cell of each row is accumulated in all the four sample capacitors, the signal voltage of the unit cell of each row accumulated in the four sampling capacitors is read out to the horizontal signal line at the same time.

(3) When four sampling capacitors are connected to the second vertical signal line in parallel and the signal voltage of the unit cells of two rows is summed, after the accumulation of the signal voltage of the unit cell of each row to one sampling capacitor is executed twice, the signal voltage of the unit cells of two rows accumulated in two sampling capacitors are read out to the horizontal signal line at the same time. When the signal voltage of the unit cell is not summed, after the signal voltage of the unit cell of each row is accumulated in all the four sample capacitors, the signal voltage of the unit cell of each row accumulated in the four sampling capacitors is read out to the horizontal signal line at the same time.

(4) When four sampling capacitors are connected to the second vertical signal line in parallel and the signal voltage of the unit cells of two rows is summed, after the accumulation of the signal voltage of the unit cell of each row to two sampling capacitors is executed twice, the signal voltage of the unit cells of two rows accumulated in four sampling capacitors are read out to the horizontal signal line at the same time. When the signal voltage of the unit cell is not summed, after the signal voltage of the unit cell of each row is accumulated in all the four sample capacitors, the signal voltage of the unit cell of each row accumulated in the four sampling capacitors is read out to the horizontal signal line at the same time.

(5) When four sampling capacitors are connected to the second vertical signal line in parallel and the signal voltage of the unit cells of two rows is summed, after the accumulation of the signal voltage of the unit cell of each row to two sampling capacitors is executed twice, the signal voltage of the unit cells of two rows accumulated in four sampling capacitors are read out to the horizontal signal line at the same time. When the signal voltage of the unit cell is not summed, after the signal voltage of the unit cell of each row is accumulated in three sample capacitors, the signal voltage of the unit cell of each row accumulated in the three sampling capacitors is read out to the horizontal signal line at the same time.

(6) When four sampling capacitors are connected to the second vertical signal line in parallel and the signal voltage of the unit cells of two rows is summed, after the accumulation of the signal voltage of the unit cell of each row to one sampling capacitor and two sampling capacitors is executed, the signal voltage of the unit cells of two rows accumulated in three sampling capacitors are read out to the horizontal signal line at the same time. When the signal voltage of the unit cell is not summed, after the signal voltage of the unit cell of each row is accumulated in all the four sample capacitors, the signal voltage of the unit cell of each row accumulated in the four sampling capacitors is read out to the horizontal signal line at the same time.

When the readout described above is executed, the smaller one of the total capacitance of the sampling capacitors used when the sum is performed and the total capacitance of the sampling capacitors used when the sum is not performed is necessary to satisfy the following equation: saturating signal voltage/100>VIN×gate capacitor/total capacitance of the sampling capacitors when the total capacitance of the sampling capacitors>>the gate capacitor and the pulse voltage of the column selection signal is VIN, so that, for example, the S/N rate of the external noise to the saturating voltage is −40 dB or less or when 10% of the external noise is generated as unevenness of the external noise among the column selection transistors, the S/N rate of the external noise to the saturating voltage at that time is −60 dB or less. For example, when the saturating signal voltage is 500 mV and VIN=3V, it is necessary that the smaller one of the total capacitance of the sampling capacitors used when the sum is performed and the total capacitance of the sampling capacitors used when the sum is not performed is about 600 times as large as the gate voltage. Here, it is desirable that the ratio between the total capacitance of the sampling capacitors used when the sum is performed and the total capacitance of the sampling capacitors used when the sum is not performed is near to 1 in order to minimize the capacitor area. A concrete total capacitance of the sampling capacitors Cspo is m×k×Csp=p×Csp=Cspo=2.4 pF when Csp (capacitance of one sampling capacitor)=0.8 pF, m=1, k=3, p=3.

Additionally, in the solid-state image sensing apparatus, the transistor and the capacitor may be composed of an n-type MOS transistor. Accordingly, since the column selection circuit is composed of the n-type MOS transistor which has lower ON resistance at the time of selecting the column compared with a p-type MOS transistor, it is possible to make the gate size of the column selection circuit smaller and to reduce the influence of the external noise from the column selection circuit. Additionally, since the capacitor is composed of the n-type MOS transistor, it is possible to make response characteristic faster. Further, since the capacitor can be formed from one layer of polysilicon not from two layers of polysilicon, it is possible to simplify the manufacturing process.

INDUSTRIAL APPLICABILITY

The present invention can be utilized for a solid-state image sensing apparatus, and especially can be utilized for a camera, which a mobile terminal has, and the like.

What is claimed is:

1. A solid-state image sensing apparatus comprising:
an image sensing region which includes: a plurality of photoelectric conversion units laid out on a semiconductor substrate two-dimensionally, each of the photoelectric conversion units converting light into signal charge; and a plurality of amplification units each of which amplifies an output from a corresponding one of the photoelectric conversion units and outputs an amplified signal;
a plurality of vertical signal lines through which signals of the photoelectric conversion units are transmitted in a column direction;
a horizontal direction selection unit operable to select a row of photoelectric conversion units from the plurality of the photoelectric conversion units laid out in the image sensing region;
a vertical direction selection unit operable to select a column of photoelectric conversion units from the plurality of the photoelectric conversion units laid out in the image sensing region; and
a first accumulation capacitor which is connected to a vertical line for each column and accumulates the signal of the photoelectric conversion unit,
wherein a capacitance of the first accumulation capacitor used when summing the signals of the photoelectric conversion units in plural rows is smaller than a capacitance of the first accumulation capacitor used when not summing the signals of the photoelectric conversion units in the plural rows.

2. The solid-state image sensing apparatus according to claim 1,
wherein the first accumulation capacitor includes: a plurality of accumulation capacitors; and an accumulation capacitor selecting unit operable to select each of the plurality of accumulation capacitors.

* * * * *